United States Patent [19]

Yoshida

[11] 4,117,574
[45] Oct. 3, 1978

[54] KNOTLESS FISH LINE CONNECTOR

[76] Inventor: William Goro Yoshida, 47-197 Iuiu St., Kaneohe, Hi. 96744

[21] Appl. No.: 892,078

[22] Filed: Mar. 31, 1978

[51] Int. Cl.² .................... F16G 11/00; A01K 91/04
[52] U.S. Cl. ............................ 24/129 R; 43/44.83; 403/291; 403/215
[58] Field of Search ............... 24/129 R, 115 J; 43/44.83, 44.84, 44.85; 403/291, 215

[56] References Cited

U.S. PATENT DOCUMENTS

| 2,547,469 | 4/1951 | Husson | 24/129 R |
| 3,102,313 | 9/1963 | Arneson | 24/129 R |

*Primary Examiner*—Bernard A. Gelak
*Attorney, Agent, or Firm*—George W. T. Loo

[57] ABSTRACT

A connector joins a fish line to a leader without the need of knotting the fish line. The fish line is passed through a cylindrical opening located at one end of a round shaft, then wound around several spiral grooves in the surface of the shaft, then passed through at least two lock holes which are approximately perpendicular to the cylindrical opening and are recessed so that the fish line does not protrude out when passing from one lock hole to another lock hole. A leader is secured to a leader opening at the other end of the shaft. A soft plastic tubing may be inserted into the cylindrical opening to prevent the weakening of the fish line while trolling.

10 Claims, 9 Drawing Figures

U.S. Patent  Oct. 3, 1978  Sheet 1 of 2  4,117,574
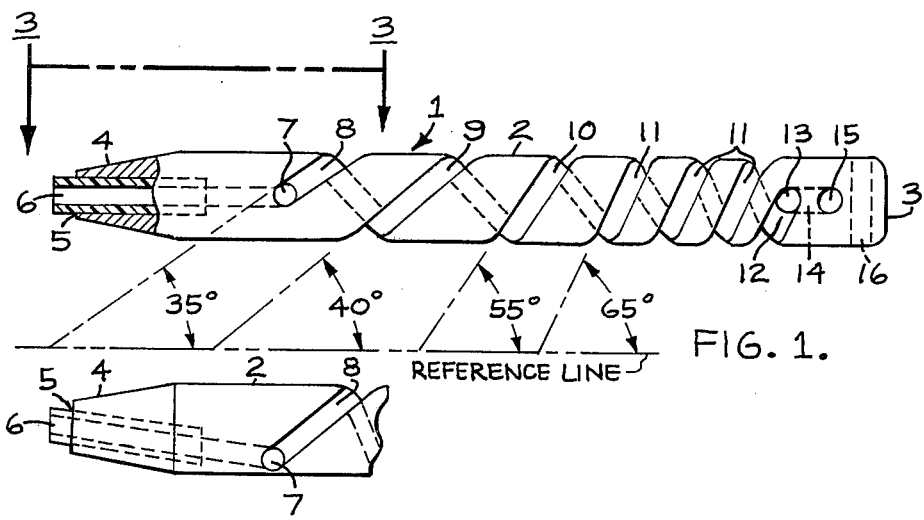
FIG. 1.  FIG. 2.
FIG. 3.
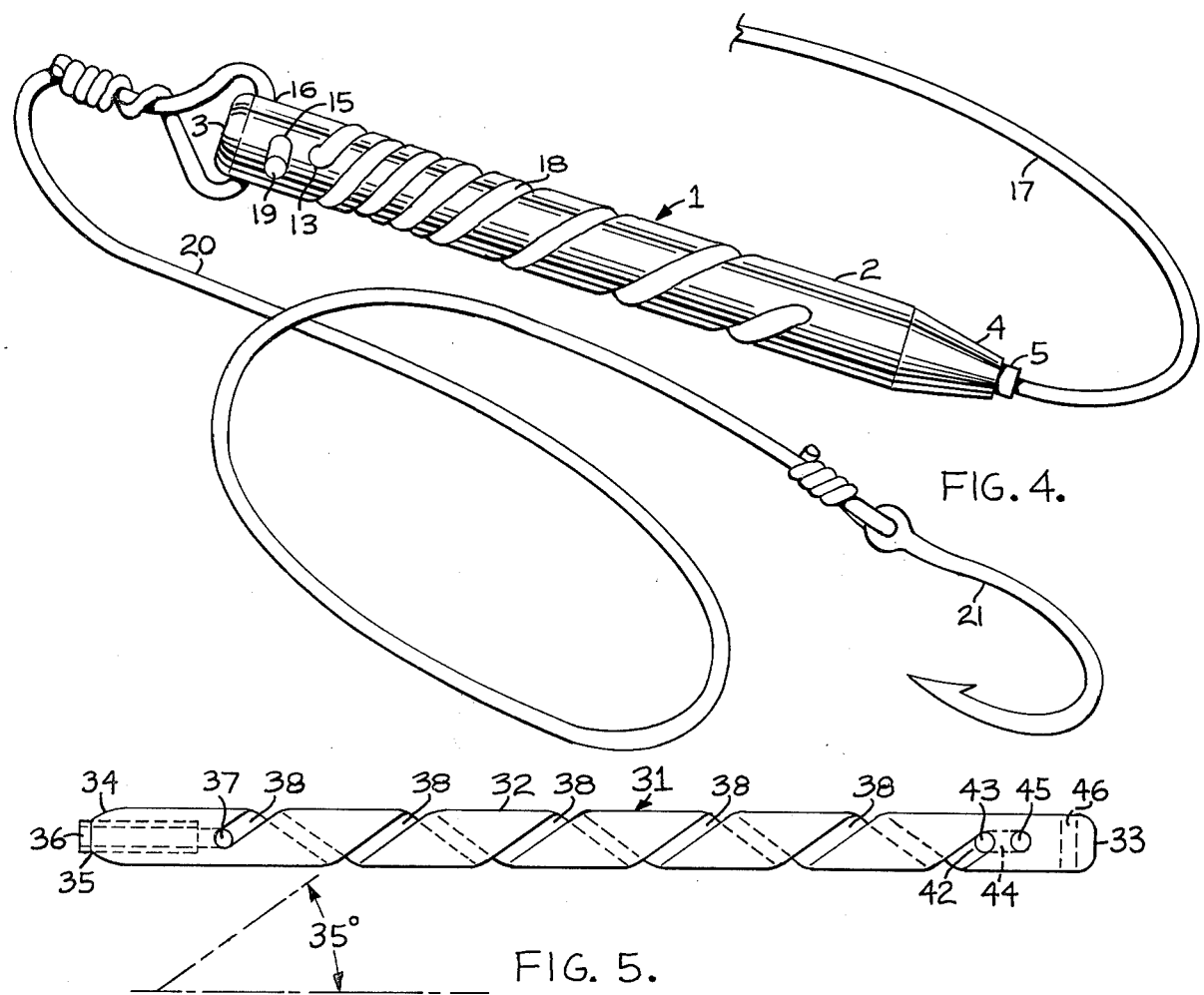
FIG. 4.
FIG. 5.

U.S. Patent  Oct. 3, 1978  Sheet 2 of 2  4,117,574
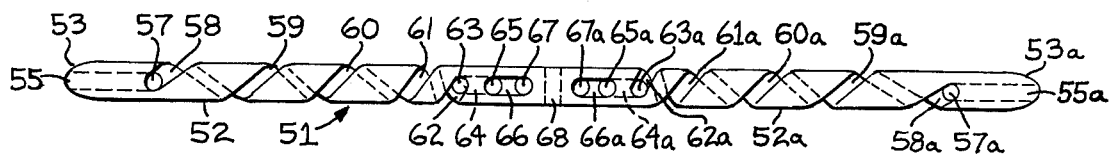
FIG. 6.
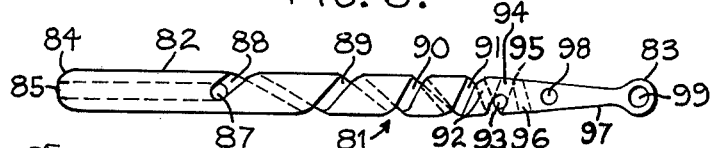
FIG. 8.
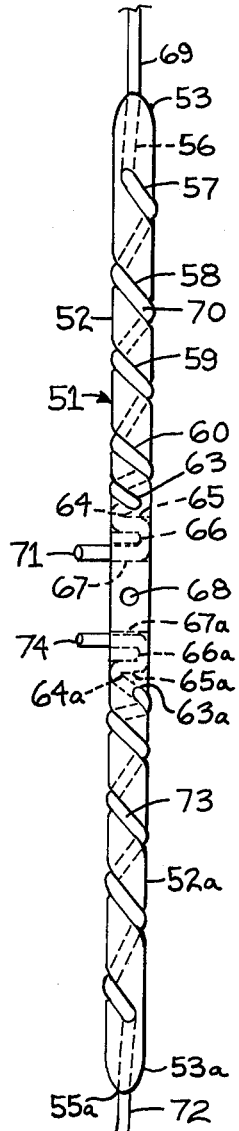
FIG. 7.
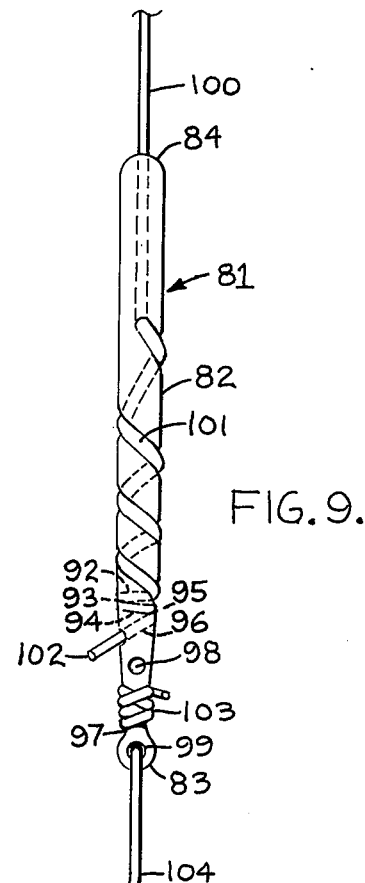
FIG. 9.
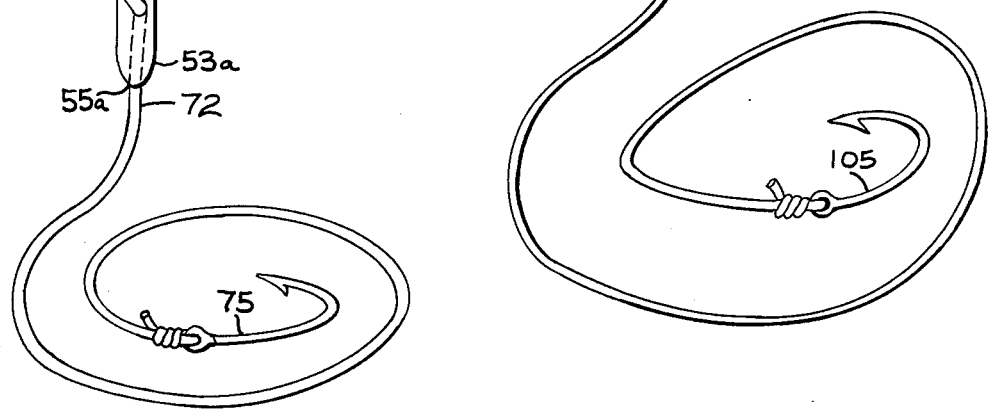

KNOTLESS FISH LINE CONNECTOR

BACKGROUND OF THE INVENTION (1) Field of the Invention.

The securing of leaders to fish lines.

(2) Description of the Prior Art.

A leader is secured to a fish line by knotting the fish line to the leader. The knot formed is the weakest part of the fish line and may cause the breaking of the fish line at the knot. In addition the fish line is usually cut to release the leader from the fish line. The present invention eliminates the need of knotting the fish line to connect the fish line to the leader. It also allows the fish line to be disconnected from the leader without cutting the fish line.

(3) Prior Art Statement.

D. F. Musto, U.S. Pat. No. 3,131,957, dated May 5, 1964, appears to be the closest prior art of which Applicant is aware. Musto discloses a tool for and method of tying knots in fish lines or leaders to secure hooks, swivels, artificial bait and the like to the fish lines. After the knot is formed, the fish line is removed from the tool. The tool is clearly different from the present invention as its function is different and as it is not left on the fish line while fishing.

SUMMARY OF THE INVENTION

The invention relates to a connector which joins a fish line to a leader without the need of knotting the fish line. It is designed especially for steel leaders, but can also be used with monofilament leaders. The connection is twice as strong or stronger than any conventional knot presently used. The fish line can be quickly attached to or detached from the connector without the need of cutting it.

An object of this invention is to provide a connector which will join a fish line to a leader without the need of knotting the fish line.

Another object of this invention is to provide a connector which can be quickly attached to or detached from a fish line.

Still another object of this invention is to provide a connector which will provide a connection between a fish line and a leader that is stronger than any conventional knot.

Yet another object of this invention is to provide a connector which will eliminate the need of knots tied to a swivel at the end of a surf casting or trolling line.

A further object of this invention is to provide a connector which eliminate the need for knots at the ends of monofilament lines used for fishing.

A still further object of this invention is to provide a connector which also may be used as a sinker on a fish line.

Another object of this invention is to provide a connector which will allow a fish line to be detached from it without the need of cutting the fish line.

Other objects, features and advantages of the present invention will be readily apparent from the following detailed description taken in connection with the accompanying drawings.

BRIEF DESCRIPTION OF THE DRAWINGS

FIG. 1 is a side view of a preferred embodiment of the invention.

FIG. 2 is an end view of the invention showing the relationship between the lock hole, recess, and leader opening.

FIG. 3 is a fragmentary top view of the invention taken on the line 3—3 of FIG. 1 showing the relationship of the angle of cylindrical opening with the shaft.

FIG. 4 is a perspective view of the invention shown in FIG. 1 connected to a fish line and to a leader.

FIG. 5 is a side view of a modification of the invention shown in FIG. 1.

FIG. 6 is a side view of a modification of the invention shown in FIG. 1.

FIG. 7 is a perspective view of the modification shown in FIG. 6 with a fish line on one end and a leader on the other end.

FIG. 8 is a side view of a modification of the invention shown in FIG. 1.

FIG. 9 is a perspective view of the modification shown in FIG. 8 with a fish line on one end and a leader on the other end.

DESCRIPTION OF THE PREFERRED EMBODIMENTS

Before explaining the present invention in detail, it is to be understood that the invention is not limited in its application to the details of construction and arrangement of the parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings wherein like reference numerals refer to like and corresponding parts throughout the several views, the preferred embodiment of the invention is disclosed in FIGS. 1 to 4 inclusive. Connector 1 includes a shaft 2, end portions 3 and 4, cylindrical opening 5, plastic tube 6, end of cylindrical opening 7, spiral grooves 8, 9, and 10, locking grooves 11, end of locking grooves 12, locking holes 13 and 15, recess 14, and leader opening 16.

The diameter and length of the shaft, the depth and width of the grooves, and the diameter of cylindrical opening and of lock holes are determined by the size of the fish line to be used with the connector. They will vary proportionately with the size of the fish line. With the use of a larger test line, they will increase proportionately in size. In addition it is very important that the spiral grooves and locking grooves are smooth to prevent the breaking of the fish line.

For a 60 pound test monofilament line, connector 1 is made out of a three-sixteenth inch diameter shaft that is 3¼ inches long. The depth and width of the spiral grooves 8, 9, and 10 and locking grooves 11 are one-sixteenth inch. Cylindrical opening 5 is one-sixteenth inch in diameter and five-eighths inch in length. It is curved at an angle of approximately 10°.

Spiral groove 8 is curved at approximately 35° angle and is five-eighths inch in length. Spiral groove 9 is curved at approximately 40° angle and is ½ inch in length. Spiral groove 10 is curved at approximately 55° angle and is five-sixteenth inch in length. Locking grooves 11 are curved at approximately 65° angle and are one-eighth inch in length. Three or more locking grooves 11 should be used for 30 pound to 60 pound test lines. Monofilament lines of 30 to 60 pound test can be used with one-sixteenth inch diameter grooves with no hinderance to surf casting.

Lock holes 13 and 15 have one-sixteenth inch diameter. Recess 14 between the lock holes 13 and 15 is one-sixteenth inch in depth so that a fish line 17 will not protrude out when passing from lock hole 13 to lock hole 15 to form a hump and so that there will be protection against damage from coral or other abrasive surface. Leader opening 16 has one-sixteenth inch diameter.

FIG. 4 shows connector 1 attached to fish line 17 and leader 20. Fish line 17 includes wrap around portion 18 and end 19. Leader 20 is attached at one end to leader opening 16 and at the other end to hook 21.

Connector 1 joins fish line 17 to leader 20 in the following manner: (1) Attach leader 20 to leader opening 16. (2) Pass fish line 17 through cylindrical opening 5. (3) Wound the fish line 17 around spiral grooves 8, 9, and 10 and around locking grooves 11 as shown in FIG. 4. (4) Pass the fish line 17 through locking holes 13 and 15. To detach fish line 17 from connector 1 do the following: (1) Push end 19 out of locking hole 15. (2) Pull fish line 17 out of locking hole 13. (3) Unwind wrap around portion 18 from the locking grooves and from the spiral grooves. (4) Pull fish line 17 out of cylindrical opening 5. Leader 20 is normally left attached to connector 1.

The cylindrical opening 5 serves as a guide to hold fish line 17 in place. Without cylindrical opening 5, the fish line 17 will unravel and slide off the grooves.

The angles of the grooves are the most important part of my invention. They are designed to distribute the stress of the fish line to prevent its breakage under normal conditions. Grooves 8, 9, and 10 are designed so that no one section of fish line 17 will have more stress than it can handle. As fish line 17 gets taut when a fish is hooked, fish line 17 will get tight and start squeezing the grooves. This squeezing of the grooves act as a partial brake. Cylindrical opening 5 and groove 8 will have the brunt of the stress, but with the least curves, the stress is partially passed on to groove 9 which with its 40° angle absorb some stress and pass some stress to groove 10 which does likewise to groove 11. Thus with a slight curve at the start and gradually getting steeper the stress on fish line 17 is accomodated. The last of grooves 11 will have the least stress so that lock holes 13 and 15 will be able to keep fish line 17 from slipping out.

Monofilament lines stretches quite a lot when the tension is great and when there is a stopper like a knot, it stretches till the knot then break. This invention allows the fish line 17 to stretch and gradually eases the tension until it reaches the last locking groove 11. So it is obvious that the more locking grooves 11 available to ease the stress in fish line 17, the better.

Spiral grooves 8, 9, and 10 can be curved at a smaller angle, say for instance 25° or 30°, and still function, but shaft 2 would have to be longer in length.

If spiral groove 8 were to be curved at a 55° angle like spiral groove 10, the invention will not work because the angle of spiral groove 8 would be too severe and would absorb the brunt of the stress, which would break fish line 17.

The purpose of plastic tube 6 is to prevent friction which would weaken fish line 17 when trolling. When trolling the lure and the connector 1 are always in motion weaving sideways and up and down. Plastic tube 6 acts as a cushion to prevent wear on fish line 17. Plastic tube 6 is made of soft plastic. It may be dispensed with if connector 1 is to be used only for surf casting. Shaft 2 should have a diameter of one-fourth inch or more in order to have a plastic tube inserted within cylindrical opening 5. Since trolling normally requires 150 pound test line for the main line and 200 pound test line for the leader, shaft 2 have a diameter of one-fourth inch or more as larger connectors are needed to accomodate the larger fish lines.

A modification of the invention is shown in FIG. 5. Connector 31 includes a shaft 32, end portions 33 and 34, cylindrical opening 35, plastic tube 36, end of cylindrical opening 37, spiral grooves 38, end of groove 42, lock holes 43 and 45, recess 44, and leader opening 46.

Spiral grooves 38 are all curved at approximately 35° angle. There must be a minimum of five spiral grooves. Six spiral grooves are preferable.

The modifications shown in FIGS. 6 and 8 may be used with 5 to 20 pound test lines on hand poles. Only one locking groove is needed to get satisfactory results as the fish lines are weak. Three lock holes are used instead of two.

Connector 51 shown in FIG. 6 includes shafts 52 and 52a, end portions 53 and 53a, cylindrical openings 55 and 55a, end of cylindrical opening 57 and 57a, spiral grooves 58, 58a, 59, 59a, 60, and 60a, locking grooves 61 and 61a, lock holes 63, 63a, 65, 65a, 67, and 67a, recesses 64, 64a, 66, and 66a, and weight hole 68.

Connector 51 is made out of a one-eighth inch diameter shaft that is 4¼ inches in length. The depth and width of the spiral grooves and locking grooves are one thirty-second inch. Cylindrical openings 55 and 55a are one thirty-second inch in diameter and three-eighth inch in length. Shafts 52 and 52a are similar to each in detail and are joined together at weight hole 68. Additional weight can be tied to weight hole 68 to get the desired weight.

FIG. 7 shows connector 51 attached to fish line 69 and leader 72. Fish line 69 includes wrap around portion 70 and end 71. Leader 72 includes wrap around portion 73 and end 74. The other end of leader 72 is attached to hook 75. Note that fish line 69 and leader 72 do not protrude out when passing from one lock hole to another lock hole.

Connector 81 shown in FIG. 8 includes a shaft 82, eye 83, end portion 84, cylindrical opening 85, end of cylindrical opening 87, spiral grooves 88, 89, and 90, locking groove 91, lock holes 92, 94, and 96, recesses 93 and 95, shank 97, weight hole 98, and leader opening 99. Connector 81 is similar to connector 51 except only one half is used with a shank 97 and eye 83 added.

FIG. 9 shows connector 81 attached to fish line 100 and leader 104. Fish line 100 includes wrap around portion 101 and end 102. Leader 104 includes looping tie 103 at one end and hook 75 attached to the other end.

Brass is the preferred material for the connector. However, any hard rust resisting material may be substituted. The connector may be used as a sinker. If it is made of light weight material, weights may be added to it.

The present invention is designed for use with surf casting and trolling fish lines. It joins a fish line to a leader without the need of knotting the fish line. It is designed especially for steel leaders, but can also be used with monofilament leaders. The connection is twice as strong or stronger than any conventional knot presently used. The fish line can be quickly attached to or detached from the connector without the need of cutting it. The elimination of the need to cut the fish line at the end of its use results in the saving of the customarily cut portion of the fish line.

The present method of connecting a fish line to a leader by tying a knot concentrate the stress at the knot. The concentration of the stress at the knot frequently causes the fish line to break at the knot, causing disappointment to fishermen, who lose the big one.

The present invention is designed to distribute the stress so that the fish line will not break under normal conditions. The stress in the fish line when a fish is hooked is distributed by the spiral grooves and possibly by the locking grooves. As the fish line gets taut and start squeezing the grooves, each of the spiral grooves, beginning with the first spiral groove, take some of the stress from the fish line, and pass on the balance, to the next spiral groove. The locking grooves will have the least amount of stress so that lock holes will be able to keep the fish line from slipping out.

The angles of the spiral grooves and the locking grooves may be the same or they may be of increasing amounts. The important thing to remember is not to have a large angle at the beginning as it would absorb the brunt of the stress thereby breaking the fish line. Also it is important to remember that too small an angle at the beginning will necessitate a longer shaft.

The area between the locking holes are recessed so that a fish line will not protrude out to form a hump and so that there will be protection against damage by coral or other abrasive surface.

The connector can be used for surf casting and for trolling. Surf casting normally requires 30 to 60 pound test lines. Trolling normally requires 150 pound test line for the main line and 200 pound test line for the leader. The size of the connector will vary proportionately with the size of the fish lines used.

The connector may be used as a sinker. Weights may be added to it if it is too light.

Although one preferred embodiment of the invention and three modifications thereof have been disclosed and described herein, it is obvious that many changes may be made in the size, shape, arrangements and detail of the various elements of the invention without departing from the scope of the novel concepts of the present invention.

I claim as my invention:

1. A knotless fish line connector comprising a shaft with a cylindrical opening at one end and a leader opening at the other end, at the end of the cylindrical opening are spiral grooves in the surface of the shaft, at the end of the last spiral groove is at least one locking groove in the surface of the shaft, at the end of the last locking groove are at least two locking holes in the shaft.

2. The knotless fish line connector of claim 1, wherein the spiral grooves are curved at different angles in increasing amounts, with the spiral groove adjacent to the cylindrical opening being curved at the smallest angle and the locking groove is curved at an angle which is greater than the largest angle of the spiral groove.

3. The knotless fish line connector of claim 2, wherein there are at least three spiral grooves and at least three locking grooves.

4. The knotless fish line connector of claim 2, wherein cylindrical opening extends longitudinally within the shaft at an angle.

5. The knotless fish line connector of claim 2, wherein the locking holes are recessed at one end so that a fish line will not protrude out when passing from one locking hole to another locking hole.

6. The knotless fish line connector of claim 1, wherein the spiral grooves and the locking grooves are curved at the same angle and there are a minimum of five grooves, at least of which are spiral grooves.

7. The knotless fish line connector of claim 2, wherein there is a plastic tube within the cylindrical opening, which acts to prevent wear on a fish line when trolling.

8. The knotless fish line connector of claim 1, wherein there are three spiral grooves, one locking groove, and three locking holes, the locking holes are recessed at one end and there is a shank between the last locking hold and the leader opening.

9. The knotless fish line connector of claim 1, wherein the leader opening includes a cylindrical opening, spiral grooves, locking grooves, and locking holes, which are identical to those claimed in claim 1 and wherein it is joined thereto at a weight hole.

10. The knotless fish line connector of claim 9, wherein there are three spiral grooves, one locking groove, and three locking holes, the locking holes are recessed at one end and the cylindrical opening extends longitudinally within the shaft at an angle.

* * * * *